(12) United States Patent
Zavoyskikh

(10) Patent No.: US 12,175,857 B2
(45) Date of Patent: Dec. 24, 2024

(54) MULTIPURPOSE NON-VISUAL WEARABLE DISPLAY

(71) Applicant: Anton Zavoyskikh, Los Angeles, CA (US)

(72) Inventor: Anton Zavoyskikh, Los Angeles, CA (US)

(*) Notice: Subject to any disclaimer, the term of this patent is extended or adjusted under 35 U.S.C. 154(b) by 0 days.

(21) Appl. No.: 18/092,093

(22) Filed: Dec. 30, 2022

(65) Prior Publication Data

US 2024/0221475 A1 Jul. 4, 2024

(51) Int. Cl.
*G08B 6/00* (2006.01)
*G01S 17/88* (2006.01)
*G09B 21/00* (2006.01)

(52) U.S. Cl.
CPC ............... *G08B 6/00* (2013.01); *G01S 17/88* (2013.01); *G09B 21/003* (2013.01)

(58) Field of Classification Search
CPC .................................. G08B 6/00; G01S 17/88
See application file for complete search history.

(56) References Cited

U.S. PATENT DOCUMENTS

| | | | | |
|---|---|---|---|---|
| 8,077,071 | B2* | 12/2011 | Cincotti | F41H 3/00 89/938 |
| 10,101,810 | B2* | 10/2018 | Li | G06F 3/016 |
| 10,533,780 | B2* | 1/2020 | Yi | F25B 21/04 |
| 10,613,630 | B2* | 4/2020 | Omote | G02B 27/028 |
| 10,747,323 | B2* | 8/2020 | Yi | H10N 10/13 |
| 11,287,890 | B2* | 3/2022 | Yi | G08B 6/00 |
| 11,755,116 | B2* | 9/2023 | Yi | A63F 13/24 340/407.1 |
| 2010/0288116 | A1* | 11/2010 | Cincotti | F41H 3/00 89/938 |
| 2012/0154196 | A1* | 6/2012 | Cincotti | F41H 3/00 342/3 |
| 2013/0135214 | A1* | 5/2013 | Li | G09F 19/00 345/173 |
| 2017/0333667 | A1* | 11/2017 | Tucker | A61B 5/0205 |
| 2019/0250710 | A1* | 8/2019 | Yi | A63F 13/28 |
| 2020/0341552 | A1* | 10/2020 | Yi | A63F 13/285 |
| 2020/0345971 | A1* | 11/2020 | Schirm | A61F 7/02 |
| 2022/0096317 | A1* | 3/2022 | Smith | A61F 7/007 |
| 2022/0179493 | A1* | 6/2022 | Yi | G06F 3/011 |
| 2022/0193538 | A1* | 6/2022 | Goh | G06V 40/20 |
| 2023/0025019 | A1* | 1/2023 | Youngblood | G02B 27/017 |
| 2024/0221475 | A1* | 7/2024 | Zavoyskikh | G08B 6/00 |

\* cited by examiner

*Primary Examiner* — Hoi C Lau
(74) *Attorney, Agent, or Firm* — OMNIVAULT LLC

(57) ABSTRACT

A non-visual wearable display device, the device comprises a body, a peltier matrix display disposed on a front surface of the body, an optical sensor disposed on a top surface of the body, a processing unit disposed within the body, the processing unit comprising a processor, a memory, and a set of instructions stored on the memory, wherein when the instructions are executed by the processor cause the device to: scan a physical environment using the optical sensor, obtain physical environment data, create an environment data set from the physical environment data obtained by the optical sensor, convert the environment data set to an input voltage set, input the input voltage set into the peltier matrix, and actuate the peltier matrix to produce a thermal image of the physical environment that is felt on a body part of a user.

17 Claims, 5 Drawing Sheets

MULTIPURPOSE NON-VISUAL WEARABLE DISPLAY

FIELD OF THE INVENTION

This disclosure generally relates to wearable display devices. Specifically, this disclosure relates to a multipurpose non-visual wearable display device.

BACKGROUND

Human beings who are visually impaired struggle every day when they find themselves in unfamiliar places. It difficult for individuals who cannot see or are totally blind to be able to detect objects in their surrounding environments, especially when those environments are not familiar. Accordingly, there is a need for an improved means of non-visual object detection.

The invention described herein the present disclosure is aimed towards solving the problem of object detection for the visually impaired. The present disclosure includes a non-visual multipurpose wearable display configured to a produce a three-dimensional representation of a physical surrounding environment of a user.

SUMMARY OF THE INVENTION

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The present invention is defined by the claims.

Embodiments of the present invention include a multipurpose non-visual wearable display.

A non-visual wearable display device, the device comprising a body, a display, a sensor system, a processing unit, the processing unit comprising a processor, a memory, and a set of instructions stored on the memory, wherein when the instructions are executed by the processor cause the device to produce a thermal image representing a surrounding environment.

In the preferred embodiment, the sensor system comprises a lidar sensor.

In the preferred embodiment, the device further comprises a strap affixed to the body of the device, wherein the strap is configured to go around the forehead of a user and secure the device to the forehead of the user.

A method, the method comprising the steps of scanning a surrounding physical environment using an optical sensor, obtaining physical environment data, creating an environment data set from the physical environment data obtained by the optical sensor, converting the environment data set to an input voltage set, actuating a peltier matrix by inputting the input voltage set into the peltier matrix, and producing a thermal image of the physical environment that is felt on a body part of a user.

In the preferred embodiment, the optical sensor is a lidar sensor.

In the preferred embodiment, the body part is a forehead of the user.

A non-visual wearable display device, the device comprising a body, a peltier matrix display disposed on a front surface of the body, an optical sensor disposed on a top surface of the body, a processing unit disposed within the body, the processing unit comprising a processor, a memory, and a set of instructions stored on the memory, wherein when the instructions are executed by the processor cause the device to:

scan a physical environment using the optical sensor, obtain physical environment data, create an environment data set from the physical environment data obtained by the optical sensor, convert the environment data set to an input voltage set, input the input voltage set into the peltier matrix, and actuate the peltier matrix to produce a thermal image of the physical environment that is felt on a body part of a user.

In the preferred embodiment, the optical sensor is a lidar sensor.

In the preferred embodiment, the device further comprises a strap affixed to the body of the device, wherein the strap is configured to go around a forehead of a user and secure the device to the forehead of the user.

BRIEF DESCRIPTION OF THE DRAWINGS

The following drawings are intended to serve as exemplary embodiments of the features disclosed in the present disclosure.

DETAILED DESCRIPTION OF DRAWINGS

Figure 1:
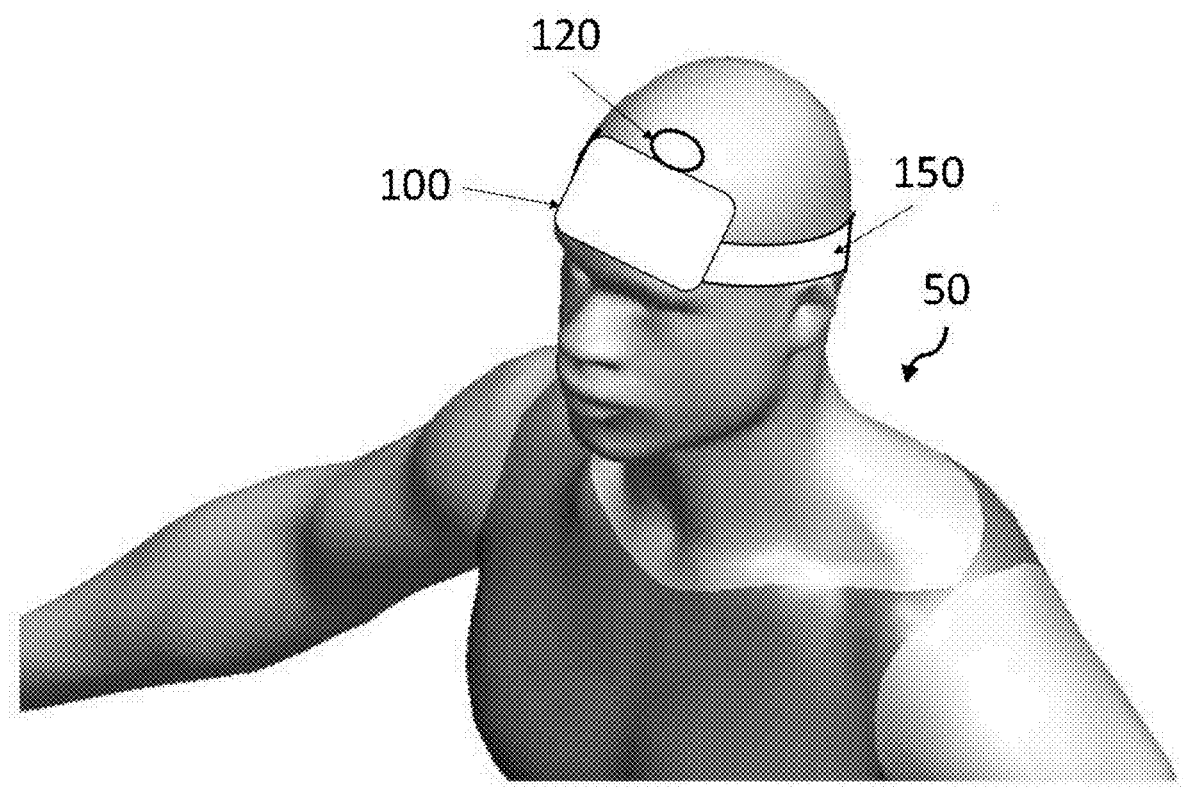
FIG. 1 is a diagram illustrating an exemplary multipurpose non-visual wearable display device being worn by a user.

The description of illustrative embodiments according to principles of several illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits are illustrated by reference to certain exemplified embodiments and may not apply to all embodiments.

Accordingly, the invention expressly should not be limited to such exemplary embodiments illustrating some possible non-limiting combination of features that may exist alone or in other combinations of features; the scope of the claimed invention being defined by the claims appended hereto.

This disclosure describes the best mode or modes of practicing the invention as presently contemplated. This description is not intended to be understood in a limiting sense but provides an example of the invention presented solely for illustrative purposes by reference to the accompanying drawings to advise one of ordinary skill in the art of the advantages and construction of the invention. In the various views of the drawings, like reference characters designate like or similar parts.

The present disclosure includes a novel multipurpose non-visual wearable display device. The device system may comprise of subsystem such as a display subsystem, a camera subsystem, an image processing subsystem, a controller subsystem, and the like. Among other things, the cameras and image processing subsystems are configured perform multiple virtual reality ("VR") functions.

The present invention may further comprise thermoelectric materials that allow direct conversion between heat and electricity via the Seebeck and Peltier effects. The Peltier effect occurs when electrical current flows across an isothermal junction of two materials, leading to a cooling/heating effect at the contact depending on the direction of current flow and the sign of the Peltier coefficient.

The device may further include a plurality of Peltier devices or elements collectively forming a Peltier matrix. Peltier devices are thermoelectric devices that operate effectively by the same principles as heat pumps. They are composed of a hot plate and a cool plate connected by a thermocouple. A thermocouple is an electrical device consisting of two dissimilar electrical conductors forming an electrical junction. A thermocouple produces a temperature-dependent voltage as a result of the Seebeck effect, and this voltage can be interpreted to measure temperature. When an electric current is passed through a circuit of a thermocouple, heat is generated at one junction and absorbed at the other junction. This is known as the Peltier effect: the presence of heating or cooling at an electrified junction of two different conductors. When electricity flows through the wire, the system will transfer heat from one side to the other. The hot side further is connected to heat-sink so it can remain at ambient temperature allowing the cool side to reach very low temperature. When a current is made to flow through a junction between two conductors, A and B, heat may be generated or removed at the junction of A and B. Thermoelectric energy conversion utilizes the Peltier heat generated when an electric current is passed through a thermoelectric material to provide a temperature gradient with heat being absorbed on the cold side, and transferred through (or pumped by) the thermoelectric materials and rejected at the sink. Accordingly, the device in the present disclosure is configured actuate the Peltier matrix to produce a heat map corresponding to the physical environment as recorded by the sensor system.

Figure 2:
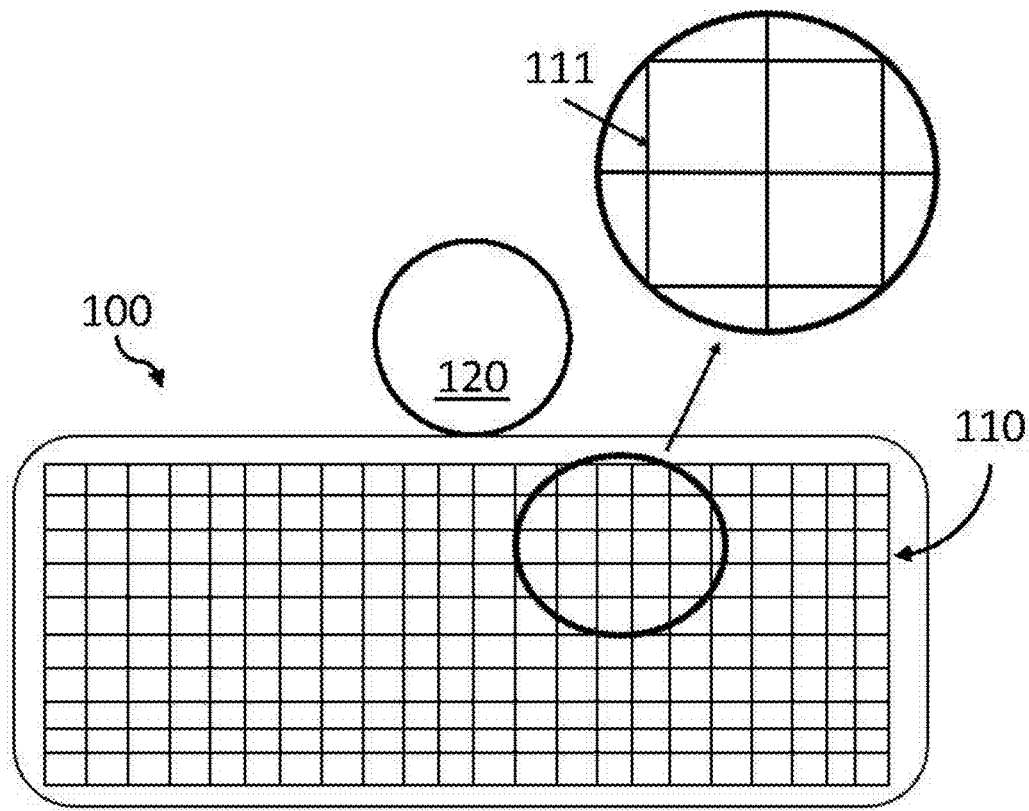
FIG. 2 is another diagram illustrating an exemplary non-visual wearable display device.

With reference to FIG. 1 and FIG. 2, an exemplary multipurpose non-visual wearable display device 100 is shown. The device 100 generally may comprise a housing 102, a flexible Peltier matrix display 110, an optical sensor 120, and a processing unit 130 configured to transmit and process environment data and generate a simulation of a surrounding environment.

The housing 102 comprises a front side, a back side, right side, a left side, a top side, and a bottom side. In the preferred embodiment, the display 110 is affixed to the front side of the housing 102. In one embodiment a strap 150 is affixed to the device 100 so the device 100 may be worn on the forehead of a user 50.

With reference to FIG. 2, the display 100 is shown being worn by a user. In the preferred embodiment, the display device 100 is worn on the forehead of a user. In some other embodiments, the device 100 may be worn on other parts of the body of a user, including around the chest, around an arm, around a leg, around the waist, and around the neck. The device 100 may be attached to a user on any part of the user's body. Further, it is contemplated that other suitable alternative means of securing the device to a user may include, but are not limited to: hook, clasp, buckle, zipper, Velcro, and the like.

With continued reference to FIG. 2, the flexible Peltier matrix display 110 is configured to produce a sensory representation corresponding to a physical three-dimensional space surrounding a user. The Peltier matrix display 110 and the optical sensor 120 may be operably coupled to the processing unit 130. The display 110 may further comprise thermoelectric materials allowing direct conversion between heat and electricity via the Seebeck and Peltier effects.

In the preferred embodiment, the optical sensor 120 is a LiDAR sensor. LiDAR (hereinafter "lidar") is an acronym of "light detection and ranging" or "laser imaging, detection, and ranging". Lidar is a method for determining ranges (variable distance) by targeting an object or a surface with a laser and measuring the time for the reflected light to return to the receiver. Lidar is sometimes also referred to as 3-D laser scanning, a combination of 3-D scanning and laser scanning. It is contemplated that other suitable alternative optical sensors may exist, including but not limited to: point sensors, distributed sensors, extrinsic sensors, intrinsic sensors, through beam sensors, diffuse reflective sensors, retroreflective sensors, and/or any combination thereof.

Figure 3:
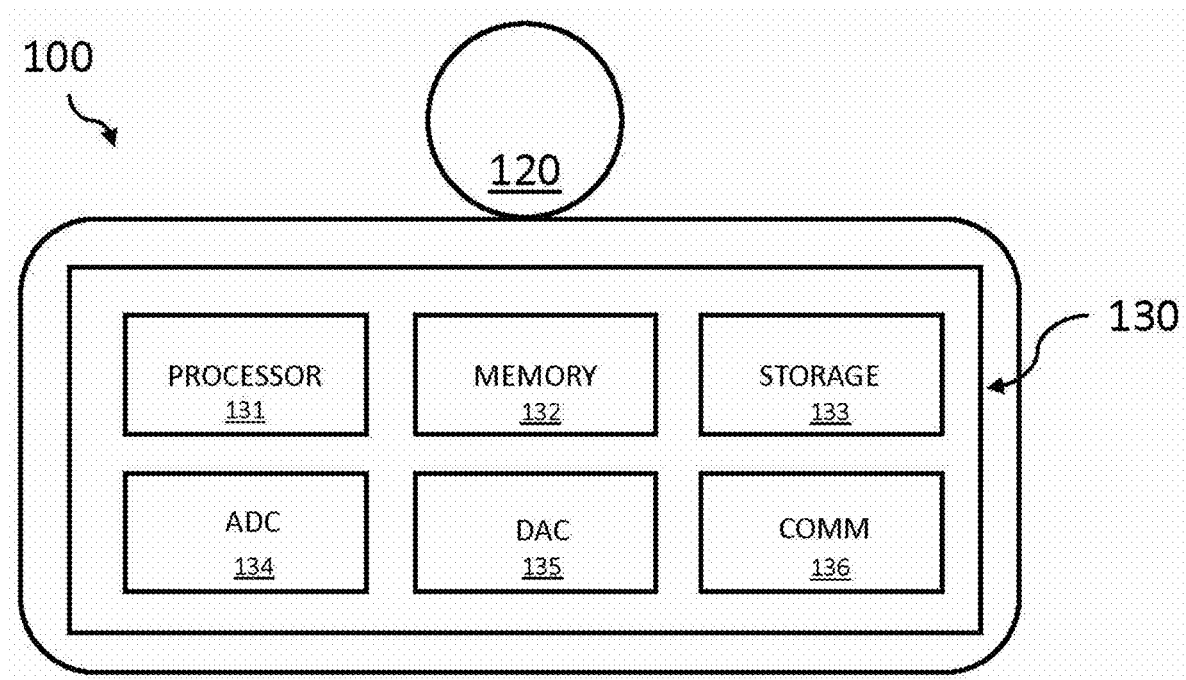
FIG. 3 is another diagram illustrating an exemplary non-visual wearable display device including an exemplary processing unit.

With reference to FIG. 3, a diagram illustrating a device 100 including associated processing unit 130 configured for performing the functions of the device 100 is shown. The processing unit 130 may comprise a processor 131, a memory 132, and a set of instructions stored on the memory 132, that when executed by the processor 131, cause the device 100 to produce a sensory experience corresponding to the physical three-dimensional space surrounding a user. Accordingly, the disclosed exemplary non-transitory machine-readable medium stores machine-readable instructions that, when executed by the processor, cause the device 100 to perform at least one operation, the at least operation including generating a thermal image representation of a surrounding environment.

In the preferred embodiment, real time data from a lidar sensor 120 is converted into the temperature of each individual Peltier element 111 in such a way that creates a thermal image of the initial 3D data. The closer the object(s) is in view of the lidar sensor 120, the warmer the corresponding pixel 111 of the flexible Peltier matrix 110, thus creating a real time thermal image of a surrounding environment. It is contemplated that just by turning their head, a user may sense and detect surrounding objects and their shape, as well as estimate the distance to them. Further, example, it is contemplated that objects in closer proximity to the user may have a higher temperature than objects that are more distant from user, allowing the user to perceive the depth within the surrounding environment. Each pixel of the Peltier matrix may be configured heat up or cool down in response to real time data transmitted from the sensor system. Accordingly, a Peltier pixel may be configured to be warmer to indicate proximity and cooler to indicate distance. Thus, three-dimensional depth perception of an environment is achieved through the present device.

Different input voltages may correspond to different output temperatures. The device 100 allows a user to mentally construct a three-dimensional representation of a surrounding environment by representing the surrounding environment as a thermal image sensed on the user's body.

The device may 100 may further comprise at least one analog-to-digital converter ("ADC") 134. An ADC converts an analog signal into a digital signal or a digital number representing the size of the voltage or current. ADCs may be implemented as integrated circuits ("IC"). In some exemplars, the device may have multiple ADCs, which may be interleaved or uninterleaved. It is contemplated that the ADC 134 may be configured to convert analog optical signals obtained from the optical sensor into digital data which may be stored in the form of an environment data set on a non-transitory computer memory.

The device 100 may further comprise at least one digital-to-analog converter ("DAC") 135. It is contemplated that the DAC may be configured to convert the digital image data set into analog signals. Accordingly, image data sent may be sent to the DAC to produce differing output voltages that are used as input voltages for the Peltier elements, wherein different input voltages cause the individual Peltier elements to produce different output temperatures.

The device 100 may further comprises a communication interface 136. The processors and memories of the device may be connected, either directly or indirectly, through a bus or alternate communication structure to one or more peripheral devices. For example, the processor 131 or the memory 132 may be directly or indirectly connected to additional memory storage, such as a hard disk drive, a removable magnetic disk drive, an optical disk drive, or a flash memory card. The processor 131 may also be directly or indirectly connected to one or more input and output devices. The input devices may include, for example, a keyboard, a touch screen, a remote-control pad, a pointing device (i.e., mouse, touchpad, stylus, trackball, joystick, etc.), a scanner, a camera, or a microphone. The output devices may include, for example, a monitor, haptic feedback device, television, printer, stereo, or speakers.

The device 100 may be directly or indirectly connected to one or more network interfaces for communicating with a database. This type of network interface, which may also be referred to as a network adapter or network interface card ("NIC"), may translate data and control signals from the processing unit into network messages according to one or more communication protocols. The communication protocols may include but are not limited to Transmission Control Protocol ("TCP"), the Internet Protocol ("IP"), and User Datagram Protocol ("UDP"). In addition, an interface may employ any suitable connection agent for connecting to a network, e.g., a wireless transceiver, a power line adapter, a modem, or an Ethernet connection.

In addition to the input, output, and storage peripheral devices specifically described, the computing devices may be connected to various other peripheral devices, including some that may perform input, output, and storage functions, or some combination thereof.

Figure 4:
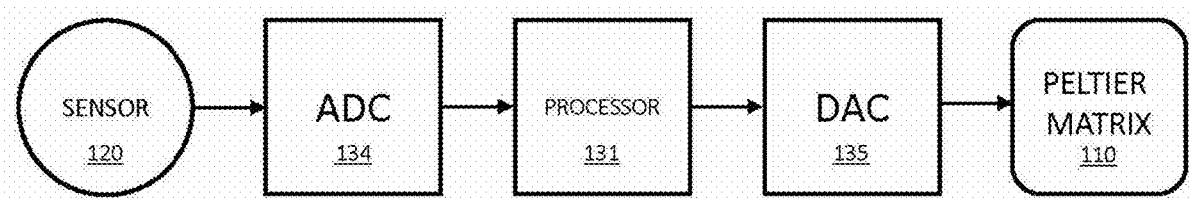
FIG. 4 is a block diagram illustrating a system for producing a representation of a surrounding physical environment using the exemplary device.

FIG. 4 is a block-diagram illustrating a system for producing a representation of a surrounding physical environment using the exemplary device. With reference to FIG. 4, the optical sensor 120 sends optical signals obtained from a physical environment to an ADC 134, wherein the ADC 134 converts the analog optical signals to a digital data set to be processed by a processor 131, wherein the processor 131 further sends the digital data set a DAC 135, wherein the DAC 135 converts the digital data set into an input voltage set that is input into the peltier matrix 110 to produce a thermal image representation of the surrounding physical environment.

The device 100 may further include at least one integrated circuit ("IC") or application specific integrated circuit ("ASIC"). Accordingly, the IC/ASIC may be configured to produce thermal image of a surrounding environment.

The device 100 may further include an accelerometer. The device 100 may further include a gyroscope. The device 100 may further include an inertial measurement unit ("IMU"). It is contemplated that data obtained by the accelerometer, gyroscope, IMU, or any combination thereof, may be aid in the recreation of a surrounding environment.

In some embodiments, the device 100 is configured to directly and/or indirectly connect and transmit data between a smartphone or like device. The smartphone may obtain surrounding environment data using onboard gyroscope, accelerometer, and/or IMU, and may send that data to the device aid in the generation of a thermal image of the environment.

In some embodiments, the device 100 may be configured to produce additional sensory indicators to perceive objects in a surrounding environment, including but not limited to, sound, vibration, odor, and/or any combination thereof.

In some embodiments, the device is used in part with a virtual reality ("VR") environment and/or augmented reality ("AR") environment.

Furthermore, aspects of the present invention may take the form of a computer program product embodied in one or more computer readable medium(s) having computer readable program code embodied thereon. In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "processing unit" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

The present invention may further comprise of at least one machine learning technique that may aid in creation of virtual representations of environments and environment data sets. Further, the machine learning technique may include the use of interpolation. Interpolation is a type of estimation, a method of constructing new data points based on the range of a discrete set of known data points. Furthermore, the present disclosure contemplates the use of at least one or more supervised learning techniques, unsupervised learning techniques, and any combination thereof. It should be understood by one of ordinary skill in the art that the at least one machine learning algorithm may include, but is not limited to: Neural-Networks, Deep Neural Networks ("DNN"), Markov Chain Monte Carlo Neural Networks ("MCMC"), Generative Adversarial Networks ("GAN"), Bayesian networks, and any other methods known to one of ordinary skill in the art have herein been considered. The term "machine learning" should not be construed by one of ordinary skill in the art to be limiting the scope of the invention disclosed in the present disclosure. The terms "machine learning", "artificial intelligence", "neural-network", may all be used interchangeably without departing from the scope and spirit of the invention disclosed in the present disclosure.

In some embodiments, the invention may be configured as a circuit. In accordance with the present disclosure, the term "circuit" refers to a collection of electrical components coupled together to create a device or system powered by electrical voltages. The circuit may be small and self-contained or a device that is part of a larger interconnected system.

Figure 5:
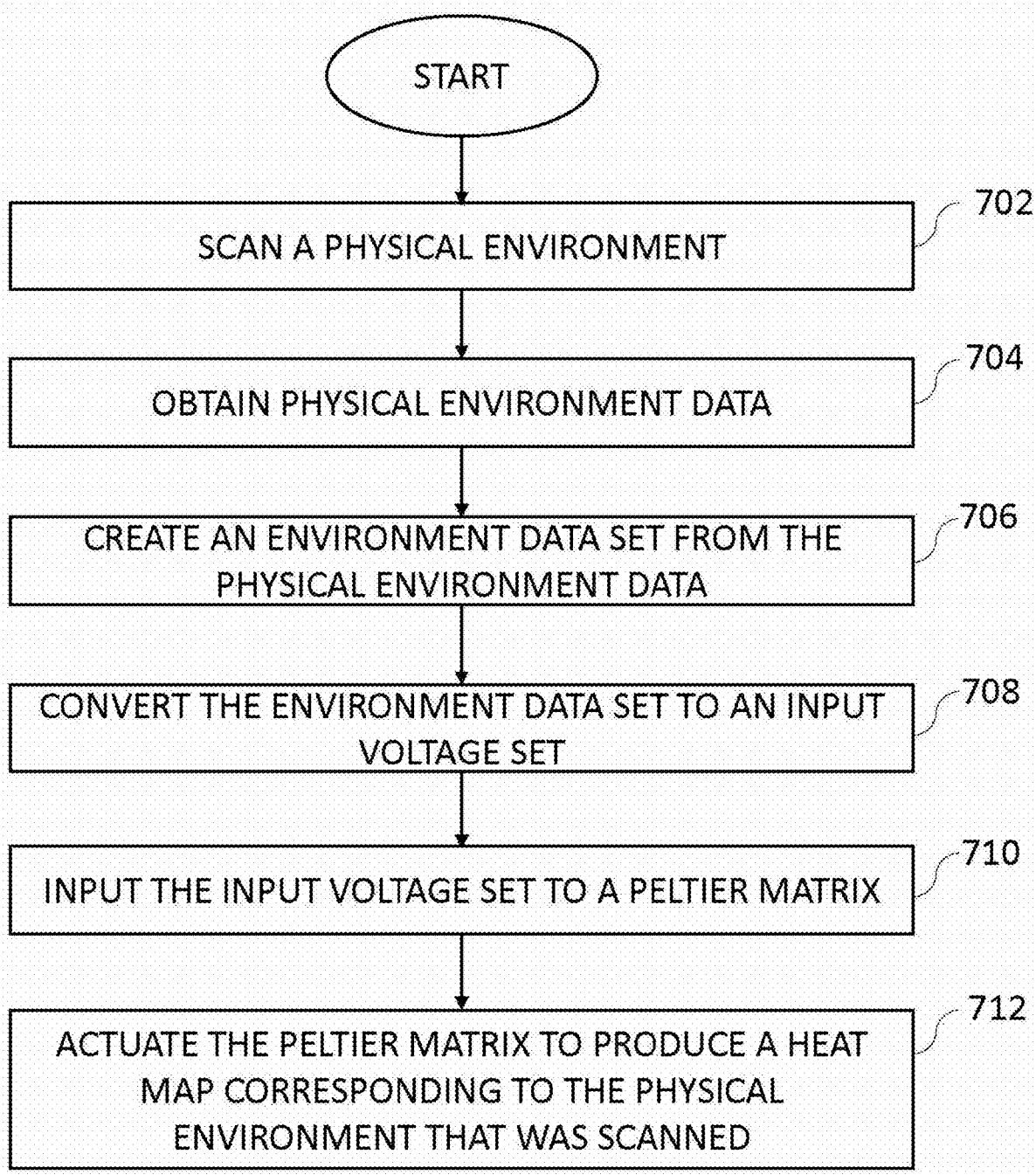
FIG. 5 is a flowchart describing an exemplary method of producing a thermal image of an environment using the exemplary device.

FIG. 5. is a flowchart illustrating an exemplary method 700 for producing a thermal image using the non-visual multipurpose device 100 disclosed in the present disclosure. In one embodiment, the device 100 is worn on the head of the user. When the user wears the device 100, the method 700 allows the user to detect objects in a surrounding environment by way of a non-visual thermal representation of surrounding environment. The performance of the device 100 may be accomplished in the following exemplary manner: scanning a physical environment using a lidar sensor, wherein the lidar sensor is configured to obtain physical environment data, obtaining physical environmental data, creating an environment data set from the environment data obtained by the lidar sensor, converting the environment data set into an input voltage set, actuating a Peltier matrix by inputting the input voltage setting, producing a thermal image of the surrounding physical environment from the input voltage set that is felt a body of a user.

First, at step 702, visual data of a surrounding environment is captured using an optical sensor. In one embodiment, visual data of a surrounding environment is captured using a lidar sensor system.

Next, at step 704, the visual data captured by the optical sensor is transmitted to an image processing unit and stored on a non-transitory computer memory. Next, at step 706, an image data set is created from the visual data. Next, at step 708, the environment data set is concerted into an input voltage set. Next, at step 710, the input voltage set is input into a peltier matrix comprising a plurality of peltier elements.

Finally, at step 712, the plurality of Peltier elements forming the Peltier matrix disposed on the device are actuated to produce a thermal image based on the visual data of the surrounding environment. The thermal image is felt on the body of the user to provide the user with an awareness of their surroundings.

In some embodiments, the method 700 may be performed on an integrated circuit ("IC") and/or an ASIC configured execute the steps of method. It is contemplated that the IC and/or ASIC may be configured obtain visual data of a surrounding environment, create a 3D representation of the surrounding environment, and reproduce the 3D representation as a thermal image allowing a wearer of the device to detect objects in the surrounding environments in real time.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A non-visual wearable display device, the device comprising:
    a body;
    a peltier matrix display coupled to the body, wherein the peltier matrix display comprises a peltier matrix comprising a set of peltier elements, wherein the peltier matrix is configured to actuate one or more elements of the set of peltier elements based on input sensor data obtained from a sensor system; and a processing unit, the processing unit comprising a processor, a memory, and a set of instructions stored on the memory, wherein when the instructions are executed by the processor cause the device to:

obtain environmental data using the sensor system; and produce a thermal image using the peltier matrix display, the thermal image representing a surrounding environment based on the environmental data obtained by the sensor system.

2. The device of claim 1, wherein the sensor system comprises a lidar sensor.

3. The device of claim 1, the device further comprising a strap affixed to the body of the device, wherein the strap is configured to go around a forehead of a user and secure the device to the forehead of the user.

4. A method, the method comprising the steps of:

scanning a surrounding physical environment using an optical sensor, obtaining physical environment data corresponding to the surrounding physical environment scanned using the optical sensor, creating an environment data set from the physical environment data obtained by the optical sensor, converting the environment data set to an input voltage set, actuating a peltier matrix by inputting the input voltage set into the peltier matrix, and producing a thermal image that is felt on a body part of a user of the surrounding physical environment scanned using the optical sensor.

5. The method of claim 4, wherein the optical sensor is a lidar sensor.

6. The method of claim 4, wherein the body part is a forehead of the user.

7. A non-visual wearable display device, the device comprising a body, a peltier matrix display disposed on a front surface of the body, an optical sensor disposed on a top surface of the body, a processing unit disposed within the body, the processing unit comprising a processor, a memory, and a set of instructions stored on the memory, wherein when the instructions are executed by the processor cause the device to:

scan a physical environment using the optical sensor, obtain physical environment data, create an environment data set from the physical environment data obtained by the optical sensor, convert the environment data set to an input voltage set, input the input voltage set into the peltier matrix, and actuate the peltier matrix to produce a thermal image of the physical environment that is felt on a body part of a user.

8. The device of claim 7, wherein the optical sensor is a lidar sensor.

9. The device of claim 8, wherein the device further comprises a strap affixed to the body of the device, wherein the strap is configured to go around a forehead of a user and secure the device to the forehead of the user.

10. The device of claim 1, wherein the sensor system comprises a point sensor.

11. The device of claim 1, wherein the sensor system comprises a through beam sensor.

12. The device of claim 1, wherein each element of the set of peltier elements actuates based on proximity of a user to an object based on the sensor data obtained by the sensor system.

13. The device of claim 1, the device further comprising a strap affixed to the body of the device, wherein the strap is configured to go around an arm of a user and secure the device to the arm of the user.

14. The device of claim 1, the device further comprising a strap affixed to the body of the device, wherein the strap is configured to go around a torso of a user and secure the device to the torso of the user.

15. The device of claim 7, wherein each element of the peltier matrix actuates based on proximity of a user to an object as represented in the environment data set.

16. The device of claim 7, wherein the sensor system comprises a point sensor.

17. The device of claim 7, wherein the sensor system comprises a through beam sensor.

* * * * *